United States Patent [19]

Hoffmann

[11] Patent Number: 5,421,942
[45] Date of Patent: Jun. 6, 1995

[54] LABEL-EQUIPPED WEB METHOD

[75] Inventor: Donald J. Hoffmann, Elmhurst, Ill.

[73] Assignee: Wallace Computer Services, Inc., Hillside, Ill.

[21] Appl. No.: 101,377

[22] Filed: Aug. 2, 1993

Related U.S. Application Data

[63] Continuation-in-part of Ser. No. 882,433, May 13, 1992, Pat. No. 5,271,787, and a continuation-in-part of Ser. No. 886,739, May 21, 1992, Pat. No. 5,254,381.

[51] Int. Cl.6 .................... B32B 31/00; B32B 31/08; B32B 31/10; B32B 31/18
[52] U.S. Cl. .................... 156/253; 156/268; 156/270; 156/289; 156/290; 156/291
[58] Field of Search ............... 156/289, 290, 291, 268, 156/270, 277, 253

[56] References Cited

U.S. PATENT DOCUMENTS 4,627,994 12/1986 Welsch .
4,961,811 10/1990 Haugwitz .................... 156/289 X

FOREIGN PATENT DOCUMENTS 2121896 5/1990 Japan .

Primary Examiner—David A. Simmons
Assistant Examiner—M. Curtis Mayes
Attorney, Agent, or Firm—Tilton, Fallon, Lungmus & Chestnut

[57] ABSTRACT

A label-equipped web method wherein the label is die-cut from base stock constituting the sheet and held in place by a pressure-sensitive adhesive-equipped release liner, the web patch constituting the release liner having a pattern of coatings thereon including a first pattern of release material so as to leave one or two uncoated edge bands and thereafter overcoated with pressure-sensitive adhesive so as to permanently attach the liner to the sheet in the band area to resist shearing forces tending to dislodge the liner.

10 Claims, 2 Drawing Sheets

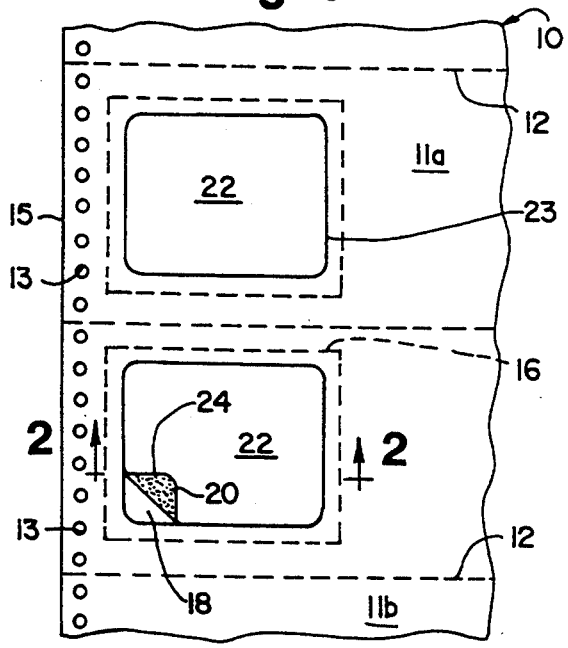
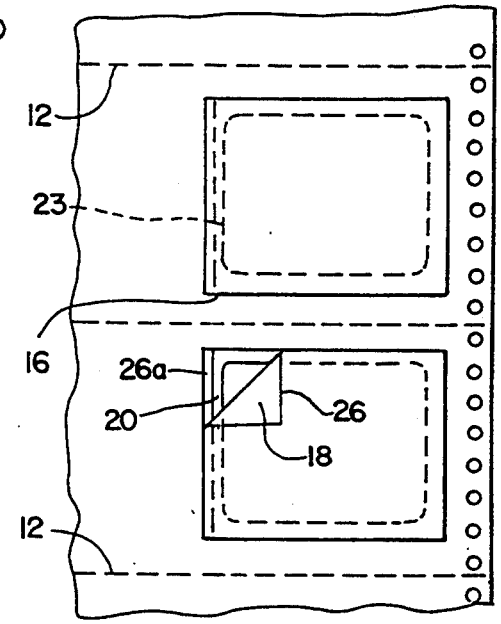
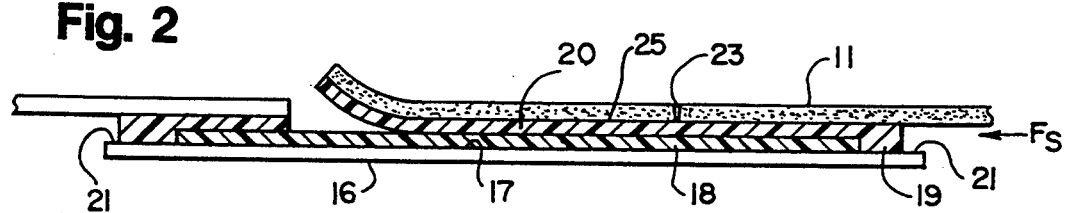
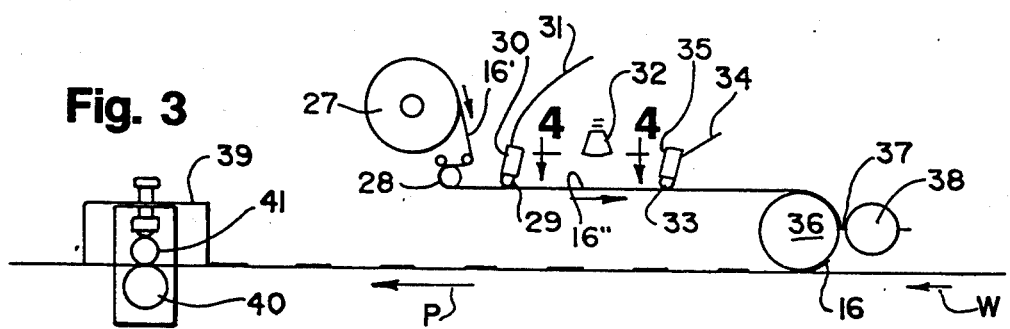
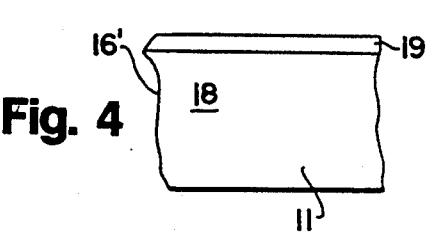
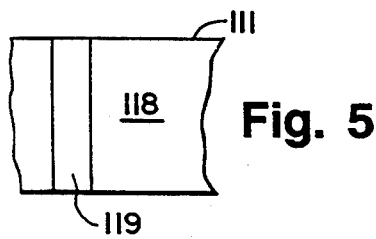

LABEL-EQUIPPED WEB METHOD

This application is a continuation-in-part of application Ser. No. 882,433 filed May 13, 1992, now U.S. Pat. No. 5,271,787, issued Dec. 21, 1993 and Ser. No. 886,739 filed May 21, 1992, now U.S. Pat. No. 5,254,381, issued Oct. 19, 1993.

BACKGROUND AND SUMMARY OF INVENTION

This invention relates to a label-equipped web method and, more particularly, to a sheet or form wherein the label is die-cut from base stock constituting the sheet, held in place by a pressure sensitive adhesive-equipped release liner, and printed thereafter.

It has become increasingly desirable to provide sheets generally and business forms particularly of minimal thickness for ease in processing through computer printers, especially table top personal computers with associated printers. One approach to achieve this has been to die cut the form itself to provide a removable label. This art is well known for die cut labels generally in U.S. Pat. Nos. 3,914,483 and 4,246,058 and for business forms in U.S. Pat. No. 4,379,573.

However, with the processing of sheets such as business forms through printers and the subsequent converting of the connected forms into a roll or a zig-zag pack, there arises the possibility of the release liner becoming detached through the imposition of shear forces. This exposes the pressure sensitive adhesive on the now-exposed face of the sheet with many undesirable consequences. Further, the current trend of omitting adhesive along the edge of an attached member increases the possibility of undesirable detachment. Illustrative of this trend in the art is exemplified by U.S. Pat. Nos. 3,926,113; 4,526,405, 4,664,416 and 5,011,559. The drawbacks of the prior art are avoided by the invention.

According to the invention, the release liner is strongly adhered to the rear face of the larger label stock web along one or two edges of the release liner. This is accomplished by providing the above-mentioned edge or edges free of release material—which is normally a silicone. The absence of a silicone on the surface of the liner confronting the adhesive provides a band on the release liner where the adhesive between the liner and web can integrate the liner and web substantially permanently. When the web over the liner is perimetrically diecut to provide a label spaced slightly from the band, the label can be removed while the web and liner remain together. Thus, there is no exposed adhesive on the rear face to cause the label stock to undesirably adhere to some other surface or sheet.

It is known to provide a wider label stock web and diecutting it over a narrower release liner—as set forth as prior art in U.S. Pat. No. 4,627,994. However, the release liner did not have an edge band or bands lacking the release coating—so it could not achieve the strong bond to the label stock web. From there, the art workers went away from the idea of a silicone free band. Instead, they went to separately attached webs as in the invention of the '994 patent and subsequent U.S. Pat. Nos. 4,696,843 and co-owned 4,865,669 and 5,006,191.

The one teaching of adhering a release liner to label stock by omitting a release material is Japanese application No. 63-274975 but did this by having a full perimeter free of release material so that the color former-equipped liner was immobilized for duplication thereon of the information printed on the label.

In the preferred embodiment of the invention, the advantages of retaining the release liner on the label sheet along an edge are provided by applying a pattern of coatings on the web patch or ply constituting the release liner. More particularly, a web ply is first coated with a pattern of release material (such as a silicone) in a pattern so as to leave an uncoated edge. Alternatively, a web ply fully coated with release material may be overcoated along an edge or edges to blank-out the silicone.

Thereafter, the entire ply is overcoated substantially over its already coated face with pressure sensitive adhesive—especially on most of the uncoated or overcoated edge or edges. When performed continuously, it is possible omit the release coating from either a longitudinal band or a transverse band and thereafter coat with adhesive this area as well as the previously release coated area. When either a continuous ply, viz., elongated web, or patches severed from a continuous ply are applied to a form or other label carrier constructed of label stock, the adhesive band of the release liner web patch adheres strongly to the form, effectively preventing detachment or dislodgment during printing and/or subsequent handling.

More particularly, the liner patch remains "frozen" in place during the imposition of shear forces to it and/or the sheet. It will be appreciated that the sheet or web usually is subjected to a number of movements parallel to its plane. Any contact with the surface bearing the liner patch will result in a force parallel to the sheet plane. Irrespective of the direction of this force, i.e., longitudinal or transverse or a combination thereof, it is effectively resisted by the permanency of the band of adhesive union between the sheet and the liner patch.

Examples other than printing where the patch-equipped sheet can be subjected to shearing forces are bursting, zig-zag folding, convolute winding and just plain insertion into an envelope. Even further, it will be appreciated that there are a myriad of forces possible in further handling which, even though they are not strictly parallel to the plane of the sheet, have a component parallel to the sheet which again can be effectively resisted by the instant invention.

The details of the invention can be seen in the ensuing specification.

BRIEF DESCRIPTION OF DRAWING

The invention is described in conjunction with the accompanying drawing, in which FIG. 1 is a fragmentary top plan view, partially in perspective of a continuous web such as business form string featuring the invention;

FIG. 2 is an enlarged sectional view such as would be seen along the sight line 2—2 applied to FIG. 1;

FIG. 3 is a side elevational view (essentially schematic) of apparatus employed in the practice of the inventive method;

FIG. 4 is a fragmentary top plan view of the initially coated web such as would be seen along the sight line 4—4;

FIG. 5 is a view similar to FIG. 4 but of a modified version of the invention;

FIG. 6 is a fragmentary bottom plan view of the form seen in FIG. 1;

DETAILED DESCRIPTION

Figure 7:
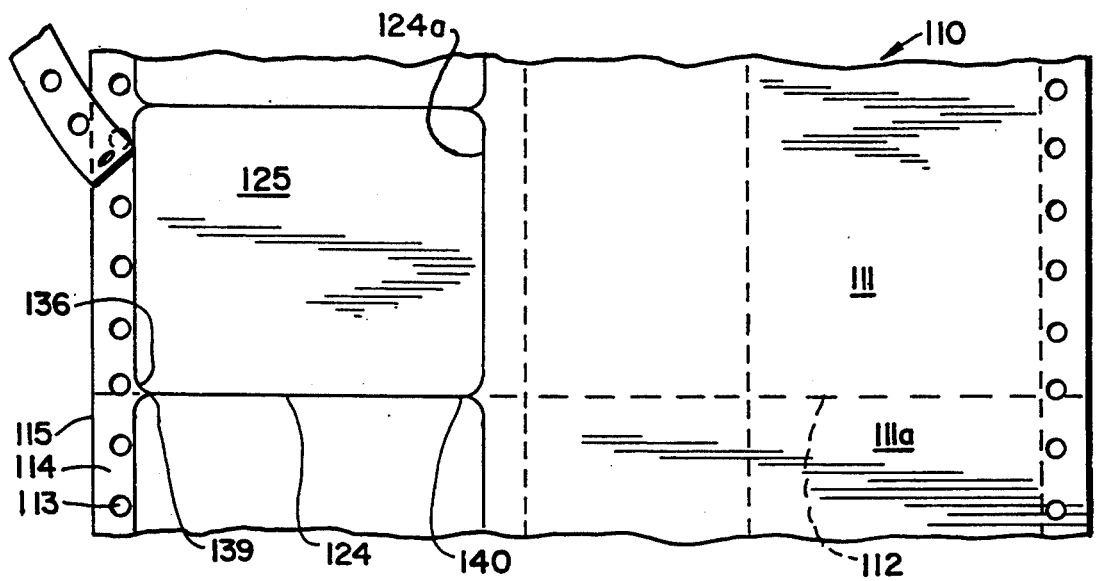
FIG. 7 is a fragmentary top plan view, partially in perspective of a portion of a continuous web such as business form string featuring another version of the invention.

Referring to FIG. 1, the numeral 10 designates generally a string of interconnected business form lengths of the general type seen in co-owned U.S. Pat. No 4,664,416. One form length is designated 11 with the adjacent preceding length being designated 11a and the following length 11b. As seen in FIG. 2, the form length is hatched to indicate paper but it will be appreciated that other label stock materials can be employed.

Usually, the form lengths are produced continuously and conveniently converted to rolls or zig-zag folded packs for shipment. Lines of transverse perforation 12 define the ends of each form length. The entire string is equipped with line holes 13 defining a control punch margin 14 along at least one longitudinally extending side 15.

Normally, however, line holes and therefore control punch margins, are provided along both longitudinal sides for better control of the web during both manufacture and subsequent processing through the computer printer—as seen in the '416 patent. However, for simplicity of presentation, the other control punch margin has been omitted from FIG. 1 and when the base stock web is just a sheet, both margins are usually omitted, as would be the case with snap-out forms.

It will be seen in FIG. 2 that the form length 11 is equipped with a novel patch 16 which combines the function of a release liner and an adhesive carrier. On one face 17 of the patch 16, a pattern of silicone material 18 is applied. It will be noted that the release coating does not extend to one edge of the patch 16, the area uncoated with release material being designated 19 (see also FIG. 4). As indicated above, two edge portions may be uncoated or overcoated to have two portions of the release liner frozen or permanently attached to the label stock. Depending upon the economics of production, intended use or further handling of the sheet or form, the two frozen edges may be both longitudinal, both transverse, or one of each. For example, a corner may be left without a confronting release surface—as where the blanking extends only partway of both an adjacent longitudinal an an adjacent transverse band. The important thing however is that to freeze an edge portion of the release liner to the label-providing web in such a way as to oppose the shearing force most likely to be encountered in the subsequent handling or use of the sheet or form. But for ease of presentation, the description herein is of an embodiment having only a single edge so prepared as to freeze to the accompanying label-providing stock.

In any event, overlying both the release coating 18 and the heretofore uncoated area 19 is a layer or coating of pressure sensitive adhesive material 20. In particular, the coating 20 extends over at least a continuous substantial portion of the area 19. It is possible to leave a minor portion 21 of the area 19 uncoated while still achieving the benefits of the invention.

As indicated above, the edge free of release material (and thus permanently bonded or "frozen" to the web 111) can be provided as seen at 119 in FIG. 5. There, the band 119 extends transversely of the length of web 111 rather than longitudinally as in FIG. 4—as by interrupting the silicone 118 as at 119. In either event, the invention can provide a series of release liner patches applied to the form lengths 11, 11a, 11b, etc.

In FIG. 1, a plurality of labels each generally designated 22 is provided by a closed perimeter die cut 23 in each of the form sheets 11, 11a, 11b, etc. A corner or edge 24 thus can be readily lifted as illustrated in FIG. 1. This exposes the silicone or other liner material 18 on the liner 16 and also the adhesive 20 on the inner face 25 of the web 11 (see FIG. 2).

In contrast, this is not possible at the portion 26 which is seen in FIG. 6. There, the attempt to "peel back" the corner results in tearing a portion of the liner as at 26a which is frozen, i.e., permanently attached to the web 11.

It is believed that the invention can be further understood by describing the method of producing the label-equipped form and this is set forth following in connection with FIG. 3.

THE METHOD OF PRODUCTION

Referring now to FIG. 3, the symbol W designates a web proceeding along a longitudinally extending path designated by an arrow P. The path normally is provided by side frames (not shown) and which carry the various processing rollers. Provided adjacent the path P is a parent roll 27 of web material suitable for silicone or other release liner application. This may be a bond paper and advantageously has a slightly higher moisture content than normal paper, viz., 5% as contrasted to the normally employed 2% for release liner patches. The continuous liner ply 16' is unwound from the roll 27 by means of an infeed 28 consisting of draw rollers and proceeds past a nozzle 29 for applying silicone release material to the face 17 thereof. The longitudinally extending silicone-free area 19 can be achieved by employing a nozzle 29 having an orifice narrower than the width of the web 16' as seen in FIG. 4 to provide the band 19 along one longitudinally extending edge of the ply 16'. If the orifice of the nozzle 29 is narrower or positioned differently, a second longitudinally extending band is provided along the opposite longitudinal edge.

Alternatively, the nozzle 29 can be equipped with a solenoid controlled valve 30 to intermittently, i.e., cyclically, interrupt flow of material in supply line 31 to the nozzle 29 so as to develop the transverse areas 119 free of release material as seen in FIG. 5. In FIG. 5, for example, if the transverse area 119 illustrated is transversely severed midway of its width, release material free bands will be provided at both the leading and trailing edges of the patch 16.

Thereafter the web 16" (now coated with a pattern or patterns of release material to develop bands 19, 119) can be subjected to drying as schematically indicated by the heat lamp 32 in FIG. 3. Next, the web 16" advances past another nozzle 33 equipped with solenoid controlled valve in supply line 34 which applies pressure sensitive adhesive continuously and substantially across the entire width of the web 16" in the case of the FIG. 4 embodiment—omiting, for example, the minor edge portions 21, if desired. These may be of the order of 1/16".

It has been found advantageous to provide a coating weight of 8-10 pounds per ream (500-22×26) of hot melt adhesive. This is in comparison with about 2 pounds per ream of water based adhesive.

Thereafter, the liner ply 16" passes around a vacuum roller 36 for engagement with the knife 37 of a cutoff roller 38. By rotating the vacuum cylinder 36 at a speed faster than the speed of the liner ply 16", spaced apart patches 16 of liner material are applied to the web W being advanced along the longitudinal path P.

Downstream of the point at which the patches or plies of liner material 16 are applied to the web W, the web W is subjected to a die cutting operation as at 39. This is brought about by the operation of a knife roller 40 bearing against an anvil roller 41 so as to cut the closed perimeter 23 only in the web W and not in the liner patch 16. It will be appreciated that the closed perimeter die cut 23 is within the confines of the release liner 16—see FIG. 1.

SUMMARY

According to the invention, a label-equipped web method employs the following steps. First, there is the step of providing a generally rectangular liner 16 coated with release material 17 except for a band 19, 119 free of the liner material and being located along one or two edges of the liner.

As indicated above, the precise shape of the silicone-free band (provided either by omitting the silicone coating or overcoating the silicone coating with a stripe of non-silicone) is advantageously a function of the type of shearing stress to be resisted. In some instances, a corner type of edge portion may be that which is "frozen" to the label-providing stock. Generally speaking, however, it is preferable to have a band or stripe of non-release material extending along an edge, either longitudinally or transversely of the web 16". Probably the simplest band to form is that along a longitudinal edge as at 19 in FIG 4 because there is required no intermittent operation of the coating-providing nozzle The method also includes the step of providing a label stock form having a size greater than the size of the liner (see particularly FIGS 1 and 6). Thereafter, the method includes the step of bringing the web 11 and the liner 16 together with pressure sensitive adhesive 20 therebetween to strongly adhere the liner band 19, 119 to the web 11. Then, the method includes the step of perimetrically die cutting the web as at 23 to provide a label 22 in a location over the liner 16 and spaced from the band 19, 119. The method further includes the step of subjecting the label-equipped web to a force tending to shear the liner from the web—as indicated at Fs in the right portion of FIG. 2—with the band 19, 119 resisting the shear force to maintain the liner against dislodgment and in position on the web.

EMBODIMENT OF FIGS. 7-11

Referring to FIG. 7, the numeral 110 designates generally a string of interconnected business form lengths. One fragmentary form length is designated 111 with the adjacent following length being designated 111a. Lines of transverse perforation as at 112 define the ends of each form length. The entire string is equipped with line holes 113 and a control punch margin 114 at least along one longitudinally extending side 115.

Figure 11:
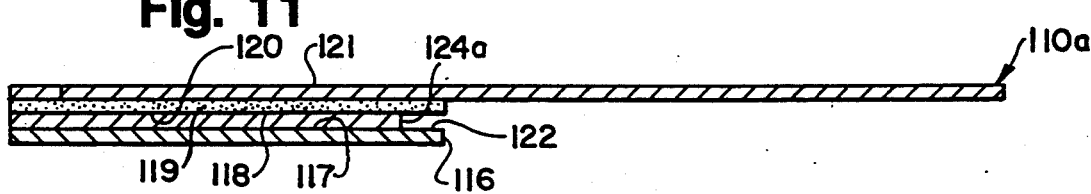

The form length 111 is equipped with a release liner 116 (usually a silicone coated ply) which can be appreciated from a consideration of FIG. 11. There, the release liner 116 has one face 117 equipped with a silicone coating 118 and over that a pressure sensitive adhesive 119. In this way, the line 116 is adhered to one surface 120 of the generally rectangular form length 111. This is the surface opposite the surface 121 which is arranged uppermost normally—as for printing.

It will be noted that the silicone coating 118 does not extend to the inboard side of the liner 116—leaving an uncoated, longitudinally-extending bind 122, This is significant advantage in the use of the invention because it affords the adhesive 119 the opportunity to lock or freeze the release liner 116 to the label stock Web 13 which makes up the form lengths 111, 111a, etc. In similar fashion, the release liner 116 is continuous—running from one form length to the next, but narrower. In other words, the liner 116 has a predetermined width and the web 123 has a width greater than that predetermined width.

A perimetric diecut is provided a 124 to define a generally rectangular label 125. A longitudinally extending portion 124a of the perimetric diecut 124 is spaced slightly inwardly of the band 12 (see FIG. 1).

Figure 8:
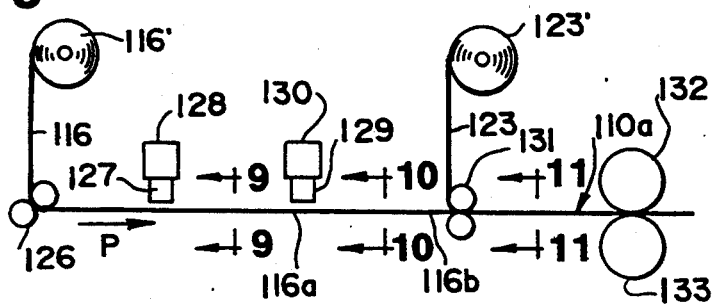
FIG. 8 is a side elevational view (essentially schematic) of apparatus employed in the practice of the inventive method.
Figure 9:
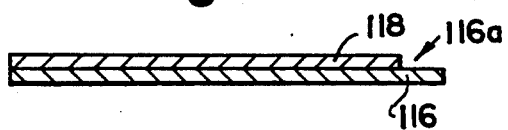
FIGS. 9-11 are transverse sectional views of the web/webs advancing from left to right in FIG. 8 as would be seen along the various sight lines 9—9, 10—10 and 11—11.

Referring now to FIG. 8, a parent roll of liner material 116' is adapted to be unwound to provide the liner 116 which then proceeds along a horizontally extending path designated by the arrow marked P. The path normally is provided by side frames (not shown) which carry the various processing rolls. Thus, provided adjacent the path P is the roll 116' of the release liner web material such as a siliconed ply. The liner ply 116 is unwound from the roll 116' by means of an infeed 126 consisting of draw rolls and thereafter the ply 116 proceeds past a nozzle 127 for applying the silicone coating 18 to the face 117 (see FIG. 11.) of the liner 116. The nozzle 127 is equipped with a solenoid operated control valve 128 which can be used to pulse the application of release material to the web 116. Thus, just downstream of the nozzle 126, the cross sectional condition of the ply 116a can be seen in FIG. 9.

Figure 10:
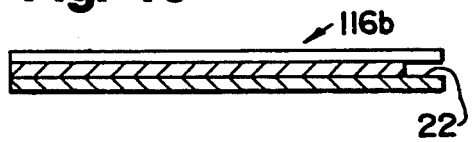

The web 116a now passes under another nozzle 129 with its associated control valve 130 by which adhesive is applied resulting in a web cross-sectional configuration designated 116b and which is depicted in FIG. 10. There it will be noted that the band 122 free of silicone coating is provided.

Still proceeding to the right in FIG. 8, the ply 116b is equipped with the web 123 which is provided by a parent roll 123' along with a suitable draw roll means 131. The condition of the composite web 110a downstream of the draw roll means 131 is seen in FIG. 11.

The diecuts are applied by a knife roll 132 (referring to the central portion of FIG. 8) operating against an anvil roll 133.

While in the foregoing specification, a detailed description of an embodiment of the invention has been set down for the purpose of illustration, many variations in the details hereingiven may be made by those skilled in the art without departing from the spirit and scope of the invention.

What is claimed is:

1. A label-equipped web method comprising the steps of providing a generally rectangular liner having one face coated with release material except for one or two bands free of said material along one or two liner edges, providing a label stock form web having a size greater than the size of said liner, bringing said web and liner together with pressure sensitive adhesive therebetween to strongly adhere said liner band or bands to said web and perimetrically diecutting said web to provide a label in a location over said liner and spaced from said band or bands, and subjecting said web to a force tending to shear said liner from said web, said band or bands resisting said shear force to maintain said liner in position on said web.

2. The method of claim 1 in which said subjecting step includes subjecting said label-equipped web and liner to printing.

3. The method of claim 1 in which said subjecting step includes subjecting said label-equipped web and liner to a manipulation wherein a force component parallel to the plane of said web is applied to said liner.

4. The method of claim 1 in which said providing step includes equipping said liner face with only one said band.

5. A label-equipped web method comprising the steps of providing generally rectangular liner having four edges, a coating of release material presenting an outer surface of said release material except for an edge portion which presents a surface of non-release material, said edge portion extending along up to two edges of said release liner, providing a label stock form web having a size greater than the size of said liner, bringing said web and liner together with pressure sensitive adhesive therebetween to strongly adhere said liner portion to said web and perimetrically die-cutting said web to provide a label in the location over said liner and spaced from said portion, subjecting said web to a force tending to shear said liner from said web, said portion resisting said shear force to maintain said liner in position on said web.

6. The method of claim 5 in which said providing step includes providing said edge portion in a form including at least a part of two edges.

7. The method of claim 6 in which said providing step includes the provision of two edges which are parallel.

8. The method of claim 6 in which said providing step includes providing two edges which are orthogonally related.

9. The method of claim 5 in which said providing step includes providing said portion as at least a part of only one edge.

10. A label-equipped web method comprising the steps of providing an elongated liner web and an elongated label stock web, applying a pattern of a release material to said liner web so as to define a band free of release material, said band extending in one of a longitudinal or transverse directions of said liner web, overcoating said liner web with a pressure sensitive adhesive including substantially over said band to provide a strip of adhesive on said band, applying the twice coated liner web to said label stock web, die cutting said label stock web to provide a rectangular label offset from said band, and subjecting said liner web to a force tending to shear said liner web from said label stock web, said band and the adhesive thereon resisting said shear force to maintain said liner web in position on said label stock web.

* * * * *